(12) United States Patent
Criel

(10) Patent No.: US 10,675,969 B2
(45) Date of Patent: Jun. 9, 2020

(54) METHOD AND SYSTEM FOR DEPRESSURIZING A VEHICULAR FUEL STORAGE SYSTEM

(71) Applicant: PLASTIC OMNIUM ADVANCED INNOVATION AND RESEARCH, Brussels (BE)

(72) Inventor: Bjorn Criel, Sint-Martens-Lennik (BE)

(73) Assignee: PLASTIC OMNIUM ADVANCED ENNOVATION AND RESEARCH, Brussels (BE)

( * ) Notice: Subject to any disclaimer, the term of this patent is extended or adjusted under 35 U.S.C. 154(b) by 478 days.

(21) Appl. No.: 14/900,790

(22) PCT Filed: Jun. 20, 2014

(86) PCT No.: PCT/EP2014/063071
§ 371 (c)(1),
(2) Date: Dec. 22, 2015

(87) PCT Pub. No.: WO2014/206895
PCT Pub. Date: Dec. 31, 2014

(65) Prior Publication Data
US 2016/0144711 A1    May 26, 2016

(30) Foreign Application Priority Data
Jun. 26, 2013  (EP) ..................... 13173897

(51) Int. Cl.
*B60K 15/035* (2006.01)
*B60K 15/03* (2006.01)

(52) U.S. Cl.
CPC .. *B60K 15/03504* (2013.01); *B60K 15/03519* (2013.01); *B60K 15/03177* (2013.01);
(Continued)

(58) Field of Classification Search
CPC ...... B60K 15/03519; B60K 2015/0319; B60K 2015/03514; B60K 2015/03538;
(Continued)

(56) References Cited

U.S. PATENT DOCUMENTS 2,148,338 A * 2/1939 Croston ................ B60K 15/05
                                                  292/144
2,620,822 A * 12/1952 Peterson ................ F16K 35/06
                                                  137/588
(Continued)

FOREIGN PATENT DOCUMENTS

CN     101344054 A    1/2009
CN     201511812 U    6/2010
(Continued)

OTHER PUBLICATIONS

International Search Report dated Aug. 29, 2014 in PCT/EP2014/063071 filed Jun. 20, 2014.

*Primary Examiner* — Timothy L Maust
*Assistant Examiner* — James R Hakomaki
(74) *Attorney, Agent, or Firm* — Oblon, McClelland, Maier & Neustadt, L.L.P.

(57) ABSTRACT

A method for depressurizing a vehicular fuel storage system including a first portion and a second portion, the first portion being in fluid communication with a closable filler head opening, the first portion being separated from the second portion by a valve, the method including: in a first time period, depressurizing the first portion by bringing the first portion in communication with the atmosphere, while the valve and the filler head opening are closed; in a second time period, depressurizing the second portion by bringing the second portion in communication with the atmosphere; and obtaining readiness for access to the filler head opening as from the end of the first time period.

16 Claims, 3 Drawing Sheets

Figure 1:
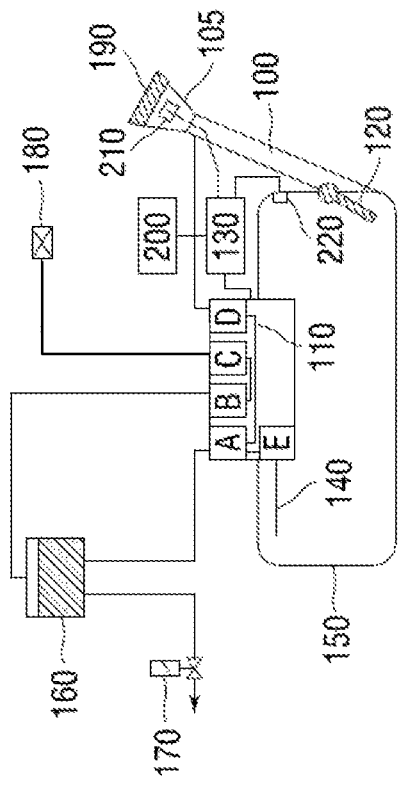

(52) U.S. Cl.
CPC .............. *B60K 2015/0319* (2013.01); *B60K 2015/0358* (2013.01); *B60K 2015/0359* (2013.01); *B60K 2015/03514* (2013.01); *B60K 2015/03538* (2013.01); *B60Y 2200/92* (2013.01)

(58) Field of Classification Search
CPC .... B60K 2015/0358; B60K 2015/0559; B60K 15/03504; B60K 15/03177; B60Y 2200/92
USPC ........................................................... 141/6
See application file for complete search history.

(56) References Cited

U.S. PATENT DOCUMENTS

| | | | | |
|---|---|---|---|---|
| 3,133,741 A * | 5/1964 | Garabello | ............ | B60K 15/05 280/834 |
| 5,462,100 A * | 10/1995 | Covert | ............ | B60K 15/03504 137/43 |
| 5,568,828 A * | 10/1996 | Harris | ............ | B60K 15/04 137/514.5 |
| 5,603,349 A * | 2/1997 | Harris | ............ | B60K 15/035 123/519 |
| 5,630,445 A * | 5/1997 | Horiuchi | ............ | B60K 15/04 137/507 |
| 5,775,307 A * | 7/1998 | Isobe | ............ | F02M 25/0809 123/198 D |
| 5,819,796 A | 10/1998 | Kunimitsu et al. | | |
| 5,878,728 A * | 3/1999 | Kidokoro | ............ | F02M 25/08 123/519 |
| 5,988,238 A * | 11/1999 | Palvolgyi | ............ | B60K 15/05 141/312 |
| 6,000,426 A * | 12/1999 | Tuckey | ............ | B60K 15/035 123/516 |
| 6,082,237 A * | 7/2000 | Bollig | ............ | B23D 33/02 83/105 |
| 6,105,556 A * | 8/2000 | Takaku | ............ | F02M 25/0809 123/520 |
| 6,260,544 B1 * | 7/2001 | Spry | ............ | B60K 15/03504 123/516 |
| 6,269,803 B1 * | 8/2001 | Corkill | ............ | F02M 25/0809 123/520 |
| 6,289,947 B1 * | 9/2001 | Heimbrodt | ............ | B60K 15/035 141/128 |
| 6,435,164 B1 * | 8/2002 | Kaiser | ............ | F02M 25/0809 123/1 A |
| 6,564,781 B2 * | 5/2003 | Matsumoto | ............ | F02M 25/0809 123/519 |
| 6,601,617 B2 * | 8/2003 | Enge | ............ | B60K 15/035 141/302 |
| 6,658,923 B2 * | 12/2003 | Fabre | ............ | F02M 25/0809 73/114.18 |
| 6,712,102 B2 * | 3/2004 | Zerangue, Sr. | ........ | B60K 15/04 141/1 |
| 6,796,295 B2 * | 9/2004 | Kidokoro | ............ | F02M 25/0836 123/520 |
| 6,854,492 B2 * | 2/2005 | Benjey | ............ | B60K 15/03519 123/519 |
| 6,988,396 B2 * | 1/2006 | Matsubara | ........ | F02M 25/0818 73/114.38 |
| 7,896,036 B2 * | 3/2011 | Kobayashi | ............ | B60K 15/00 141/347 |
| 7,990,275 B1 * | 8/2011 | Milanovich | ........ | F02M 37/0082 210/741 |
| 8,000,856 B2 * | 8/2011 | Larsen | ............ | B60K 15/05 701/30.7 |
| 8,397,552 B2 * | 3/2013 | Jackson | ............ | B60K 15/03519 73/40 |
| 8,640,676 B2 * | 2/2014 | Horiba | ............ | F02M 25/089 123/516 |
| 2002/0046609 A1 * | 4/2002 | Ito | ............ | F02M 25/0809 73/700 |
| 2002/0153374 A1 * | 10/2002 | Isobe | ............ | F02M 25/089 220/86.2 |
| 2005/0279406 A1 * | 12/2005 | Atwood | ............ | B60K 15/035 137/39 |
| 2006/0065253 A1 * | 3/2006 | Reddy | ............ | F01N 5/02 123/520 |
| 2007/0137730 A1 * | 6/2007 | DeCapua | ............ | B60K 15/0406 141/311 R |
| 2008/0236685 A1 * | 10/2008 | Nourdine | ............ | B60K 15/04 137/599.18 |
| 2009/0216426 A1 * | 8/2009 | Wang | ............ | F02D 41/00 701/103 |
| 2010/0126477 A1 * | 5/2010 | Reddy | ............ | F02M 25/0836 123/520 |
| 2010/0252006 A1 * | 10/2010 | Reddy | ............ | B60K 15/03504 123/519 |
| 2011/0315127 A1 * | 12/2011 | Jackson | ............ | F02M 25/0809 123/521 |
| 2013/0096774 A1 * | 4/2013 | Takata | ............ | B60R 16/02 701/36 |
| 2014/0352796 A1 * | 12/2014 | Dudar | ............ | B60K 15/035 137/15.01 |

FOREIGN PATENT DOCUMENTS

| | | | | |
|---|---|---|---|---|
| CN | 201922926 U | | 8/2011 | |
| DE | 10020000 A1 | * | 12/2001 | ............ B60K 15/04 |
| DE | 100 38 243 A1 | | 2/2002 | |
| DE | 10 2007 011 891 A1 | | 9/2008 | |
| DE | 10 2007 036 112 A1 | | 2/2009 | |
| EP | 0864456 A2 | * | 9/1998 | ............ B60K 15/04 |
| JP | 7-269422 A | | 10/1995 | |
| JP | WO 2012131885 A1 | * | 10/2012 | ........ F02M 25/089 |
| KR | 20020054371 A | * | 7/2002 | |
| WO | WO 2012175456 A2 | * | 12/2012 | ....... B60K 15/03519 |

\* cited by examiner

METHOD AND SYSTEM FOR DEPRESSURIZING A VEHICULAR FUEL STORAGE SYSTEM

The present invention pertains to the field of vehicular fuel storage systems, and in particular to fuel tanks for hybrid vehicles, fuel cells powered vehicles or non-hybrid internal combustion engine vehicles.

Vehicles propagated by an internal combustion engine may be equipped with a fuel vapor venting circuit, through which fuel vapor is led from the fuel tank to a fuel absorbing canister. In this manner, a build-up of excessive pressure in the tank, for example under the influence of diurnal temperature changes, can be avoided. A purge circuit is provided through which the internal combustion engine may retrieve the absorbed fuel when it is put into operation.

Hybrid vehicles are adapted to be propagated alternatively by means of an electric motor or an internal combustion engine. A specific derivation of the hybrid uses electricity only for the first 60 to 100 km of a given journey, assuming the vehicle was plugged into electrical power for a predetermined amount of time before the journey. These vehicles are deemed "plug-in hybrids". A "plug-in hybrid" vehicle may go many driving cycles without ever running the internal combustion engine. In these circumstances, the canister cannot be expected to be purged on a regular basis, so it must be generally decoupled from the tank to avoid oversaturating the canister. As a result, the fuel tank of such a hybrid vehicle must be designed to contain larger amounts of fuel vapor, and to withstand higher pressure levels.

However, the increased pressure inside the fuel tank must be relieved in an environmentally safe manner prior to opening the tank for a refueling operation, to avoid releasing relatively large amounts of fuel vapor into the environment, or blowing fuel vapors onto the vehicle operator's face.

In known systems, the pressure relief is effectuated by bringing the tank in fluid communication with the canister at the request of the vehicle operator, who typically has to push a button on the dashboard to that effect. Given the pressure drop introduced by the various valves and lines in the venting circuit, the pressure relief will take a certain a time, which can be in the order of 10 seconds. This time is considered inconveniently long.

DE 102 007036112 A1 in the name of BAYERISCHE MOTOREN WERKE AG discloses a system having a check valve device provided in a filler tube of a fuel tank, where the device is pressure sealed and locked outwards in the tank with excess pressure opposite to ambient pressure. The device is arranged in the tube in such a manner that the device is opened without a mechanical contact with a tank pump nozzle during refueling. The fuel flows into the tube through the nozzle. A valve is opened in an air separator vent pipe when a person opens a cover or a catch at the tube, where the person performs a refueling operation.

While DE 102 007036112 A1 reduces the time between the pressure relief request and the moment at which the actual refueling operation can start, it has the disadvantage of releasing any vapors that may be present in the filler tube—which may be a substantial amount—into the environment.

It is an object of embodiments of the present invention to reduce the time between the pressure relief request and the moment at which the actual refueling operation can start, without presenting the aforementioned disadvantage.

According to an aspect of the invention, there is provided a method for depressurizing a vehicular fuel storage system comprising a first portion and a second portion, the first portion being in fluid communication with a closable filler head opening, the first portion being separated from the second portion by means of a valve, the method comprising: in a first time period, depressurizing the first portion by bringing the first portion in communication with the atmosphere, while said valve and said filler head opening are closed; in a second time period, depressurizing the second portion by bringing the second portion in communication with the atmosphere; and obtaining readiness for access to the filler head opening as from the end of said first time period.

Throughout this application, the terms "depressurization" and "pressure relief" are used to designate the process of balancing the internal fuel system pressure with the ambient pressure. Balancing implies getting the internal fuel system pressure within a small difference of the ambient pressure; this difference may be between −50 mbar and 50 mbar; it is preferably between −20 mbar and 20 mbar; and even more preferably between −10 mbar and 10 mbar.

The end of depressurization conditions can be determined:
 from the comparison of a measured pressure with a predetermined pressure range;
 after a predetermined time has elapsed.

When the depressurization condition is achieved, then readiness for access to the filler head opening is obtained.

Of course, the depressurization conditions can be calibrated in function of the operating conditions, for example, the ambient temperature, internal tank temperature, ambient pressure and the fuel volatility, etc.

The first time period and the second time period may start at the same time, or approximately the same time. Alternatively, the second time period may start later than the first time period. In particular, the second time period may start when the first time period ends, i.e. when the depressurizing of the first portion has completed.

The present invention is based inter alia on the insight of the inventor that the time to readiness can be reduced by providing a staged pressure relief, wherein a sealed portion of the fuel storage volume that faces the filler opening is initially depressurized, upon completion of which access to the filler pipe can be allowed while the pressure in the remainder of the fuel storage volume is being relieved. Once readiness is obtained, the user can open the fuel cap without being exposed to excessive hydrocarbons vapors. Moreover, the emissions into the atmosphere will be reduced.

In an embodiment of the method according to the present invention, the first portion comprises a filler neck.

This embodiment significantly reduces the time needed between the moment the driver requests a refueling operation and the moment he is allowed to open the fuel cap, especially if a high pressure is present inside the tank (for example 350 mbar). On current sealed fuel systems, the complete fuel system is depressurized in one step, which leads often to depressurization times between 5 and 10 seconds. Since the volume of the filler pipe is very small (typically less than 1 liter), it can be depressurized in less than a few seconds.

In an embodiment of the method according to the present invention, the communication with the atmosphere is established via a canister.

The use of a canister for absorbing hydrocarbons present in the gas flow minimizes the amount of hydrocarbons released into the environment while venting portions of the fuel storage system.

In an embodiment of the method according to the present invention, prior to the depressurizing of the first portion, the first portion is isolated from the atmosphere and from the canister, if present; the depressurizing of the first portion taking place upon detection of a refueling operation initiation.

In this embodiment, the venting circuit is normally closed. This avoids (over)saturating the canister and/or releasing large amounts of fuel vapors into the environment when there is no opportunity to purge the canister for prolonged periods of time.

The isolation from the atmosphere and the canister applies at least to the second portion, i.e. the bulk of the capacity of the storage system, and optionally also to the first portion, i.e. the portion in communication with the filler head.

In a particular embodiment, the detection of the refueling operation initiation comprises detecting a button being pressed.

In another particular embodiment, the detection of the refueling operation initiation comprises detecting a fuel flap (i.e. fuel door) being manipulated. The manipulation may consist of pulling the flap open, or attempting to open it by disengaging a push-push lock, which is common on fuel flaps.

In another particular embodiment, the detection of the refueling operation initiation comprises detecting a fuel cap being manipulated. The manipulation may consist of turning the fuel cap over a certain angular extent.

In an embodiment, the method according to the present invention further comprises indicating readiness for access to the filler head opening upon completion of the depressurizing of the first portion.

Where the detection of the refueling operation initiation comprises detecting a fuel flap being manipulated, the indicating may comprise unlocking the fuel flap. In that case, the vehicle operator is physically prevented from completely opening the flap accessing the filler head opening until the primary venting has completed.

Where the detection of the refueling operation initiation comprises detecting a fuel cap being manipulated, the indicating may comprise unlocking the fuel cap. In that case, the vehicle operator is physically prevented from completely opening the fuel cap and accessing the filler head opening until the primary venting has completed.

In a particular embodiment, the indicating comprises providing a visual or auditory signal to a vehicle operator.

Such a signal allows the vehicle operator to decide when it is safe to open the filler head opening.

In an embodiment of the method according to the present invention, the fuel storage system is adapted to contain gasoline. In another embodiment the fuel storage system is adapted to contain a mixture of gasoline with a Methanol and/or an Ethanol content from 0-95%.

The present invention is particularly useful in the context of systems for storing gasoline, because that type of fuel will generate particularly vapors when the temperature increases and thus build-up pressure inside the fuel system.

According to an aspect of the invention, there is provided a fuel storage system comprising a first portion and a second portion, the first portion being in fluid communication with a closable filler head opening, the first portion being separated from the second portion by means of a valve, a valve arrangement configured to allow bringing the first portion in communication with the atmosphere and to allow bringing the second portion in communication with the atmosphere; the valve arrangement being controlled by a controller configured to carry out the method as described above.

In an embodiment, the fuel storage system according to the present invention further comprises indicator means adapted to indicate readiness for access of the filler head opening, the valve arrangement and the indicator means being controlled by a controller configured to carry out the method as described above.

According to an aspect of the invention, there is provided a computer program product and a non-transitory computer readable medium, comprising code means configured to make a controller carry out the method as described above.

According to an aspect of the invention, there is provided a computer program product, comprising code means configured to make a controller carry out the method as described above.

Figure 2:
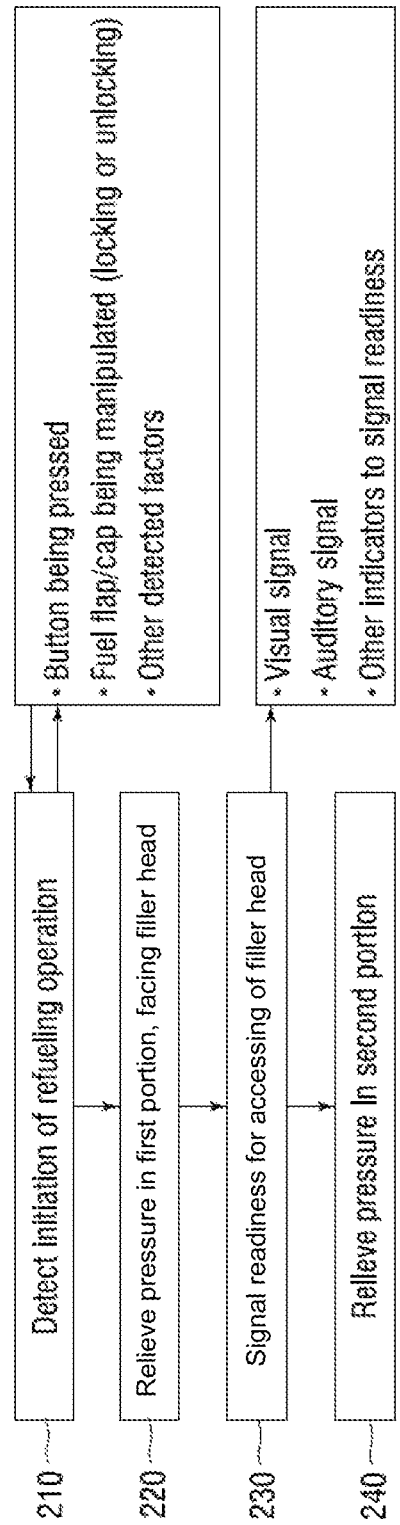
Figure 3:
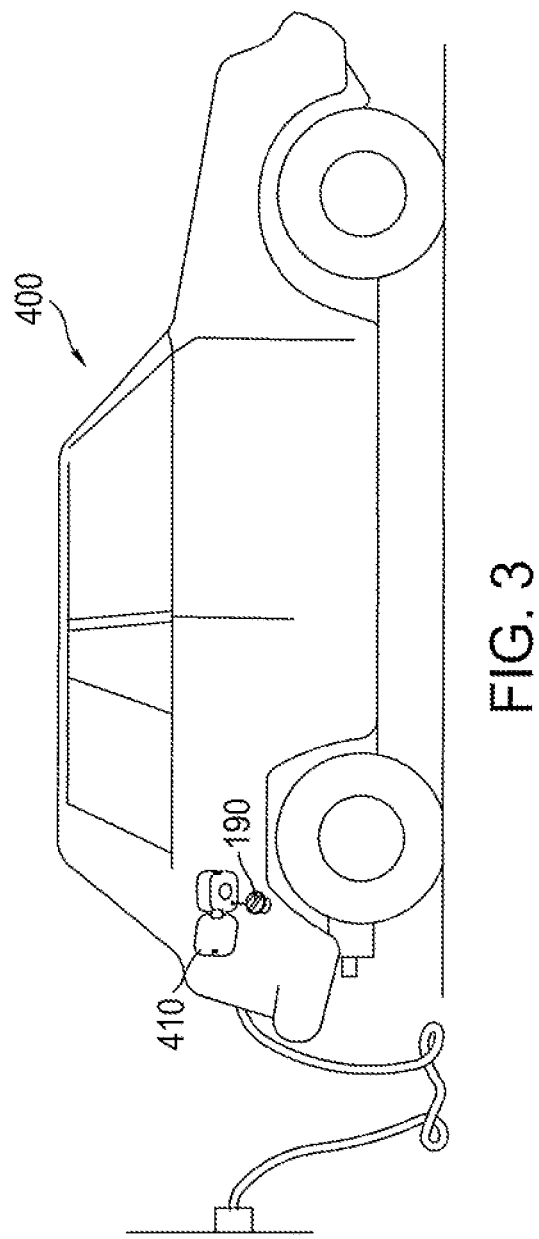
Figure 4:
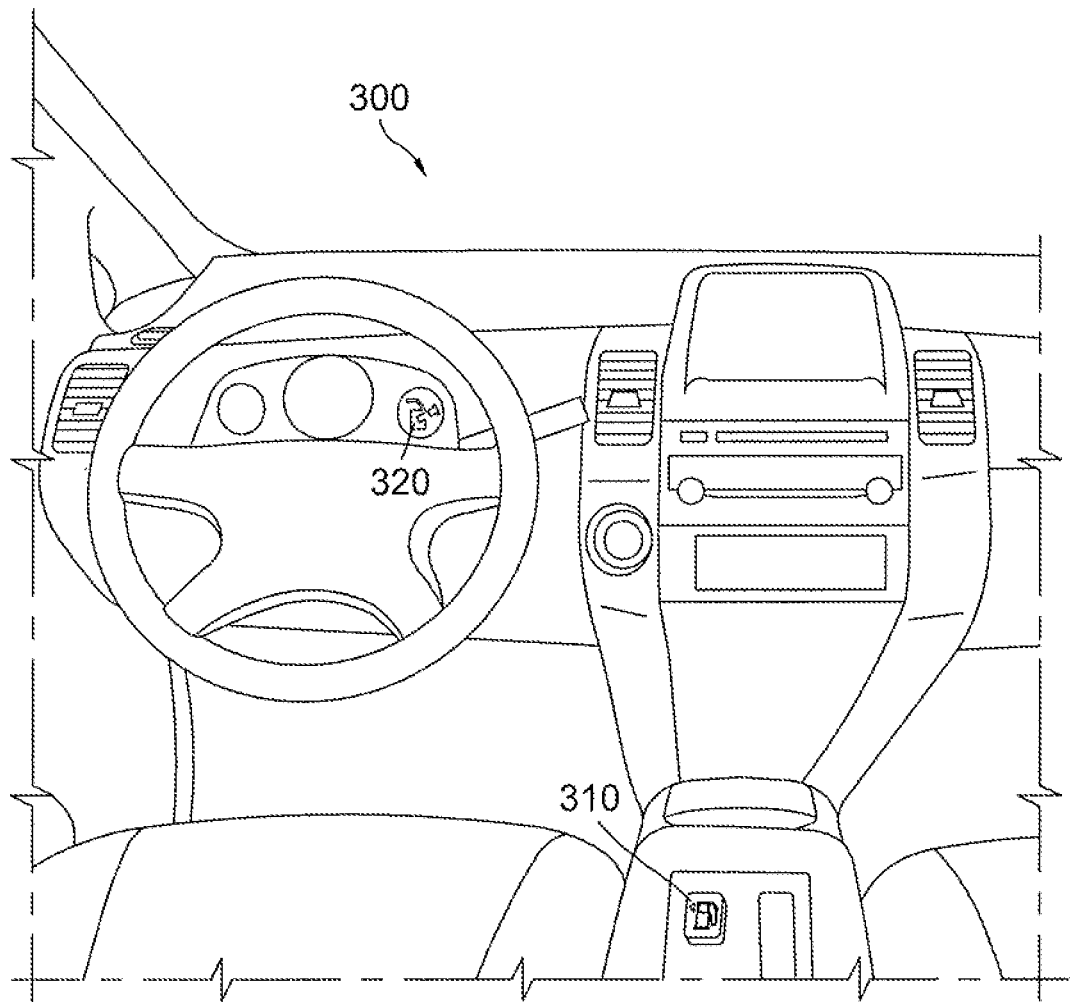

These and other aspects and advantages of the present invention will now be described in more detail with reference to the accompanying drawings, in which:

FIG. 1 schematically represents a fuel system according to an embodiment of the present invention;

FIG. 2 present a flow chart of a method according to an embodiment of the present invention;

FIG. 3 presents a plug-in hybrid vehicle according to an embodiment of the present invention; and FIG. 4 presents a dashboard of the vehicle according to an embodiment of the present invention.

The system of FIG. 1 includes a fuel tank 150, communicating with a filler neck 100 ending in a filler head 105. Without loss of generality, the illustrated filler head 105 is closed off by a fuel cap 190; a capless arrangement, with a suitable closure mechanism integrated in the filler head, may also be used.

The fuel tank 150 used in embodiments of the present invention is preferably made of plastic (i.e. its wall is principally made of plastic).

The term "plastic" means any material comprising at least one synthetic resin polymer.

Any type of plastic may be suitable. Particularly suitable plastics belong to the category of thermoplastics.

In particular, it is possible to use polyolefins, thermoplastic polyesters, polyketones, polyamides and copolymers thereof. A blend of polymers or copolymers may also be used, similarly it is also possible to use a blend of polymeric materials with inorganic, organic and/or natural fillers such as, for example but non-limitingly: carbon, salts and other inorganic derivatives, natural or polymeric fibers. It is also possible to use multilayer structures composed of stacked and joined layers comprising at least one of the polymers or copolymers described above.

One polymer that is often used is polyethylene. Excellent results have been obtained with high-density polyethylene (HDPE).

The wall of the tank may be composed of a single thermoplastic layer, or of two layers. One or more other possible additional layers may, advantageously, be composed of layers made of a barrier material to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolyzed ethylene/vinyl acetate copolymer). Alternatively, the tank may be subjected to a surface treatment (fluorination or sulfonation) for the purpose of making it impermeable to the fuel.

The tank preferably comprises an EVOH-based barrier layer located between the HDPE-based outer layers.

The fuel tank 150 is vented via an internal vent line 140, whose open end is situated in an upper portion of the tank, which normally constitutes the "vapor dome" above the surface of the liquid fuel present in the tank. The venting circuit further includes a canister 160 and lines that connect the clean-air end of the canister to the atmosphere via an atmosphere port 180. The canister 160 can be purged from its fuel-vapor end over a line that connects to the internal combustion engine via the canister purge valve 170. An additional valve (not shown) may be present in the vent line to block access to the canister, so as to avoid exposing it to fuel vapors for extended periods of time without intermediate purging.

An internal check valve 120 seals the main volume of the fuel tank 150 from the filler neck 100.

The internal check valve 120 is configured to open if the pressure inside the filler pipe 100 is higher than the pressure inside the fuel tank 150. In the example illustrated in FIG. 1, the internal check valve 120 is of the flapper type. In other embodiment, the opening and closing of the internal check valve 120 can be mechanically managed by a spring. In yet another embodiment, the internal check valve 120 can be replaced by an electronic check valve.

Embodiments of the system according to the invention allow the vehicle operator to more quickly remove the fuel cap and introduce the nozzle in the nozzle guide of the filler pipe by passing through the following sequence of steps:
  depressurization of the filler pipe 100;
  opening of the filler cap 190;
  introduction of the refueling nozzle;
  start refueling of the fuel system.

The depressurization of the rest of the fuel system 150 may start substantially simultaneously with the depressurization of the filler pipe 100 and continue thereafter, in order to have a very low pressure at the start of the refueling operation. Alternatively, the depressurization of the rest of the fuel system 150 could start when the depressurization of the filler pipe 100 is finished.

The different stages of the pressure relief process according to the present invention are controlled by a valve arrangement 110. The valve arrangement 110 may consist of one or more valves of any of the various types known to the skilled person, which are configured to allow opening or sealing of the following valve channels:
  Port D to Port A: this valve channel allows fuel vapors present in the filler neck 100 to reach the canister 160;
  Port E to Port A: this valve channel allows fuel vapors present in the vapor dome of the fuel tank 150 to reach the canister 160;
  Port B to Port C: this valve channel allows relatively clean air from the clean-air side of the canister 160 to reach the atmosphere port 180.

Preferably, the valve arrangement 110 is further configured to prevent reverse flows from the canister 160 to the fuel tank 150 or the filler neck 100 at all times.

In a particular embodiment, the valve arrangement 110 can be replaced by an electronic valve of the same type as the one described in the European patent application EP n°13176402.9, in the name of the Applicant, the content of which is also incorporated by reference into the present application.

On the other hand, an inflow of clean air (via respective port connections C-D and/or C-E) may optionally be permitted to relieve a situation of underpressure in the fuel tank 150 and/or the filler neck 100.

Venting of the filler neck 100 can be achieved by opening valve channels D-A and B-C, while the internal check valve 120 is kept closed. Depending on the arrangement of the valve(s), it may be necessary to also close valve channel E-A at this stage.

Venting of the main volume of the fuel tank 150 can be achieved by opening valve channels E-A and B-C, while the internal check valve 120 is kept closed.

The valve arrangement 110 may be a fully automated arrangement, or an assembly of one or more valve elements that are externally managed, for example by the ECU or a dedicated fuel system control unit. Without loss of generality, the controlling element is illustrated in FIG. 1 as fuel system control unit 130. The fuel system control unit 130 can be any conventional combination of hardware and software 200 (FIG. 1) that can be configured to control the steps of the method according to the present invention. To that effect, it receives signals from various sensors 210, 220 (FIG. 1) and actuates the appropriate elements in the valve arrangement 110. It may further control unlocking of the fuel flap and/or the fuel cap, in accordance with the corresponding embodiments of the present invention that are described herein. The sensors 210, 220 include a sensor to detect a request to start a refueling operation and separate pressure sensors in each of the portions of the fuel storage system (in particular, the filler neck 100 and the main tank 150) to determine completion of the depressurization stages. In a particular embodiment, a single pressure sensor can be placed in the fuel storage system such that it gives at a first time period a measurement of the pressure within the filler pipe 100 and at a second later time period a measurement of the pressure within the fuel tank 150. In an advantageous embodiment, the valve arrangement 110 can be replaced by an electronic valve comprising one or more pressure sensors 210, 220 for measuring pressure within the filler pipe and/or within the fuel tank.

An embodiment of the staged depressurization method of the invention will now be described in more detail with respect to FIG. 2.

As shown in FIGS. 3-4, the initiation of a refueling operation is typically accompanied by a specific action of the vehicle 400 operator, such as pressing a dedicated button 310, opening the flap 410 covering the filler head, and the like. Accordingly, the detection of the initiation of a refueling operation of step 210 can be achieved by detecting a button press, or by detecting opening of the flap 410, or by partial opening of the filler pipe cap 190, or by detecting partial insertion of the refueling nozzle (in particular in the case of capless filler heads), and the like. When the refueling operation is initiated by the opening of the fuel door (manually or electronically), the necessity of having a refueling request button 310 on the dashboard 300 is removed, which could lead to cost reduction.

The detection step 210 is optional, in the sense that the remainder of the method may also be triggered by an electronic control unit, upon occurrence of predetermined conditions.

In the next step 220, pressure is relieved from a first partial volume (or "portion"), which faces the filler head. Depressurization of the first portion takes less time than the depressurization of the entire fuel storage system. As the first portion is the portion that faces the filler head—and thus the vehicle operator—it suffices to depressurize this portion to allow the vehicle operator access to the filler head. In this manner, access to the filler head opening is expedited relative to the prior art solutions.

Upon completion of the depressurization of the first portion, which is detected by an appropriately located pressure sensor, the system is ready for the requested refueling operation; i.e., the filler assembly can now be accessed in a safe manner. Preferably, the system explicitly signals or indicates its readiness 230 for the requested refueling operation. This "indicating" may be accomplished in a variety of ways. The safest ways are those where the vehicle operator is initially physically prevented from accessing the filler head (e.g. by locking of the fuel cap of flap), and where the readiness of the system is indicated by removing this prevention (e.g., by unlocking the fuel cap of flap). Other common ways to indicate system conditions include visual indicators 320 and auditory indicators.

Between the signaled readiness and the actual start of fuel flow, the vehicle operator will have to complete opening flap and cap, insert the nozzle, and engage the filler pistol's flow lever. These operations take a certain amount of time, during which the depressurization 240 of the second portion can continue and possibly even complete.

Although the depressurization of the second portion is illustrated as a consecutive step 240 in FIG. 2, it is possible to start this step in parallel with the depressurization of the first portion (step 220).

Upon completion of the depressurization 240 of the second portion, which is detected by an appropriately located pressure sensor, the actual refueling can commence. If the depressurization 240 of the second portion has not completed by the time the vehicle operator attempts to start the flow of fuel, the internal check valve 120 should be kept closed, to immediately trigger the automatic shut-off system of the fuel nozzle. Accordingly, the internal check valve 120 should be adapted to be forced closed upon receiving a signal to that effect. The internal check valve 120 shall be allowed to return to its normal condition (normally closed, opened by overpressure from the filler head side) when the depressurization 240 of the second portion is completed.

Where reference is made in the above description to a "vehicle operator", this refers without limitation to any person who, at a given time, is involved in the operations concerning the vehicle. It may be a gas station attendant, a driver, a mechanic, etc.

While the invention has been described hereinabove with reference to separate system and method embodiments, this was done for clarifying purposes only. The skilled person will appreciate that features described in connection with the system or the method alone, can also be applied to the method or the system, respectively, with the same technical effects and advantages. Furthermore, the scope of the invention is not limited to these embodiments, but is defined by the accompanying claims.

The invention claimed is:

1. A method for depressurizing a vehicular fuel storage system, the method comprising:
    providing the vehicular fuel storage system including a first portion and a second portion, the first portion being in fluid communication with a closable filler head opening and including a filler neck, the first portion being separated from the second portion by a valve, the second portion including a tank;
    in a first time period, depressurizing the first portion by bringing the first portion in communication with the atmosphere without depressurizing the second portion, while the valve and the filler head opening are closed;
    in a second time period, depressurizing the second portion by bringing the second portion in communication with the atmosphere while keeping the first portion depressurized; and
    indicating readiness for access to the filler head opening as from the end of the first time period.

2. The method according to claim 1, wherein the communication of the second portion with the atmosphere is established via a canister.

3. The method according to claim 2, wherein prior to the depressurizing of the first portion, the first portion is isolated from the atmosphere and from the canister, and the depressurizing of the first portion takes place upon detection of a refueling operation initiation.

4. The method according claim 3, wherein the detection of the refueling operation initiation comprises detecting a button being pressed.

5. The method according to claim 3, wherein the detection of the refueling operation initiation comprises detecting a fuel flap being manipulated.

6. The method according to claim 3, wherein the detection of the refueling operation initiation comprises detecting a fuel cap being manipulated.

7. The method according to claim 3, further comprising indicating readiness for access to the filler head opening upon completion of the depressurizing of the first portion.

8. The method according to claim 7, wherein the detection of the refueling operation initiation comprises detecting a fuel flap being manipulated, and wherein the indicating comprises unlocking the fuel flap.

9. The method according to claim 7, wherein the detection of the refueling operation initiation comprises detecting a fuel cap being manipulated, and wherein the indicating comprises unlocking the fuel cap.

10. The method according to claim 7, wherein the indicating comprises providing a visual or auditory signal to a vehicle operator.

11. A fuel storage system comprising:
    a first portion and a second portion, the first portion being in fluid communication with a closable filler head opening, the first portion being separated from the second portion by a valve;
    a valve arrangement configured to allow bringing the first portion in communication with the atmosphere and to allow bringing the second portion in communication with the atmosphere;
    the valve arrangement being controlled by a controller configured to carry out the method of claim 1.

12. The fuel storage system according to claim 11, further comprising an indicator configured to indicate readiness for access to the filler head opening.

13. A plug-in hybrid vehicle comprising the fuel system according to claim 11.

14. A non-transitory computer readable medium, comprising computer code configured to make a controller carry out the method of claim 1.

15. A method for depressurizing a vehicular fuel storage system, the method comprising:
    providing a vehicular fuel storage including a first portion including a filler neck, and a second portion, the first portion being in fluid communication with a closable filler head opening, the first portion being separated from the second portion by a valve, the second portion including a tank;
    in a first time period, depressurizing the first portion by bringing the first portion in communication with the atmosphere by way of a valve channel extending from the filler neck without depressurizing the second portion, while the valve and the filler head opening are closed;
    in a second time period, depressurizing the second portion by bringing the second portion in communication with the atmosphere while keeping the first portion depressurized; and
    indicating readiness for access to the filler head opening as from the end of the first time period.

16. A method for depressurizing a vehicular fuel storage system, the method comprising:
  providing a vehicular fuel storage including a first portion including a filler neck, and a second portion, the first portion being in fluid communication with a closable filler head opening, the first portion being separated from the second portion by a valve, the second portion including a tank:
  in a first time period, depressurizing the first portion by bringing the first portion in communication with the atmosphere without depressurizing the second portion, while the valve and the filler head opening are closed; and
  in a second time period, depressurizing the second portion by bringing the second portion in communication with the atmosphere while keeping the first portion depressurized,
  wherein the filler neck is depressurized as from the end of the first time period.

* * * * *

UNITED STATES PATENT AND TRADEMARK OFFICE
CERTIFICATE OF CORRECTION

| | | |
|---|---|---|
| PATENT NO. | : 10,675,969 B2 | Page 1 of 1 |
| APPLICATION NO. | : 14/900790 | |
| DATED | : June 9, 2020 | |
| INVENTOR(S) | : Bjorn Criel | |

It is certified that error appears in the above-identified patent and that said Letters Patent is hereby corrected as shown below:

On the Title Page

Item (73), the Assignee's name is incorrect. Item (73) should read:
-- (73) Assignee: PLASTIC OMNIUM ADVANCED INNOVATION AND RESEARCH, Brussels (BE) --

Signed and Sealed this
Twenty-fifth Day of August, 2020

Andrei Iancu
*Director of the United States Patent and Trademark Office*